Figure 3:
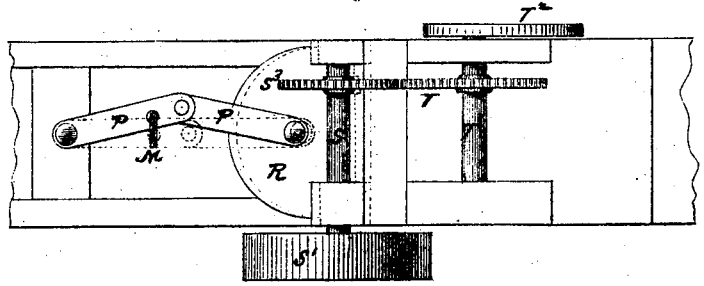

Sheet 1. 2 Sheets
Josiah Pierce & Augustin B. Curtis' Impt in Spoke Lathe
118148 Fig. 1 PATENTED AUG 15 1871
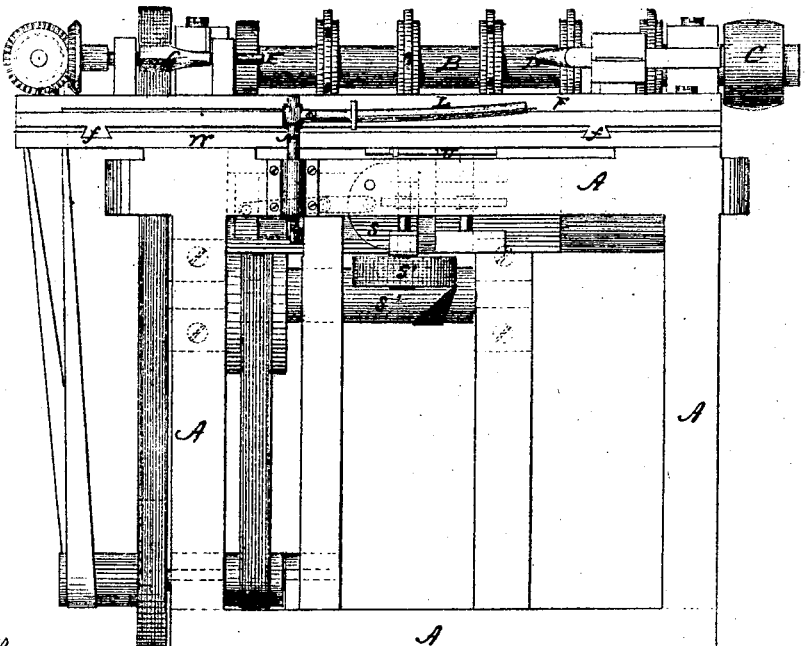
Witnesses
J. H. Shumway
A. J. Tibbetts
Fig. 2
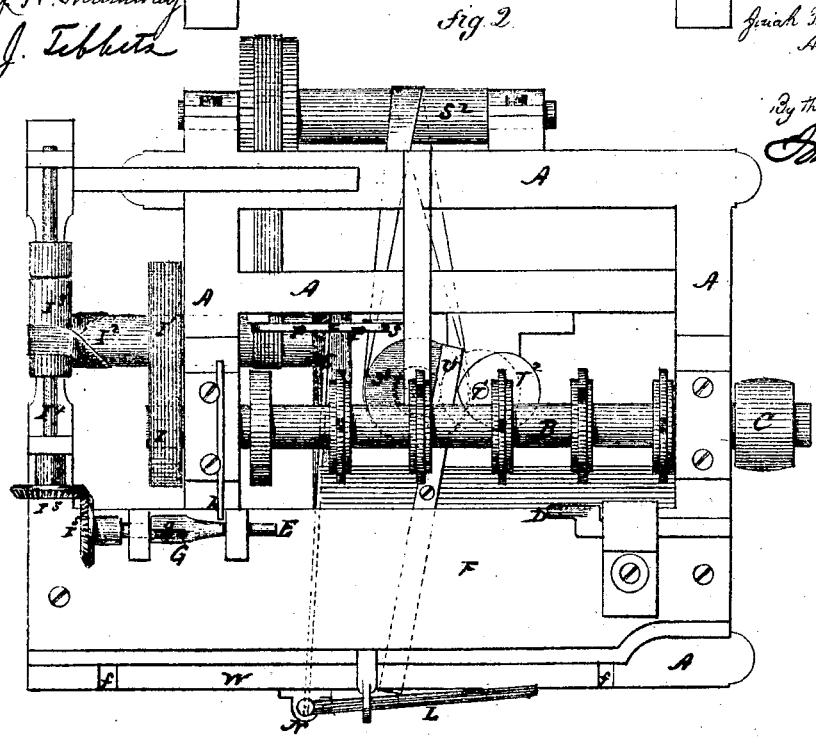
Josiah Pierce &
Augustin B. Curtis
Inventors
By their Attorney
John E. Earle
AM. PHOTO-LITHOGRAPHIC CO. N.Y. (OSBORNE'S PROCESS)

Sheet 2. 2 Sheets

Josiah Pierce & Augustin B. Curtis' Impt in Spoke Lathe.

118148

Witnesses:
J. H. Shumway
A. J. Tibbits

Josiah Pierce & Augustin B. Curtis
Inventors
By their Attorney
John E. Earle

No. 118,148

UNITED STATES PATENT OFFICE.

JOSIAH PIERCE AND AUGUSTIN B. CURTIS, OF NEW HAVEN, CONNECTICUT.

IMPROVEMENT IN SPOKE-LATHES.

Specification forming part of Letters Patent No. 118,148, dated August 15, 1871.

*To all whom it may concern:*

Be it known that we, JOSIAH PIERCE and AUGUSTIN B. CURTIS, of New Haven, in the county of New Haven and State of Connecticut, have invented a new Improvement in Spoke-Lathes; and we do hereby declare the following, when taken in connection with the accompanying drawing and the letters of reference marked thereon, to be a full, clear, and exact description of the same, and which said drawing constitutes part of this specification, and represents, in—

Figure 1, a front view; Fig. 2, a top view; and in Fig. 3, a sectional view beneath the cutter-shaft, looking to the rear.

This invention relates to an improvement in machines for turning irregular forms, especially adapted for turning spokes, and as an improvement upon the machine known as the "Ward spoke-lathe," patented February 22 and June 28, 1853. The object of our invention is to form the square part of the spoke without removing from the lathe; and consists in a mechanism, combined with cutters, guiding-cam, and form, whereby after the spoke is turned the square portion is formed without removing it from the machine.

A is the frame, upon which the cutter-shaft B is arranged in suitable bearings, driven by the pulley C, to cause the required revolution of the cutters. D is the fixed center, and E the turning center, between which the spoke is fixed, the said centers being arranged upon a sliding table, F, which said table is arranged upon guides $f$ to allow the table to be moved to and from the cutters. On the turning center E the form G is placed, which revolves with the center, and caused to revolve at the required velocity through connecting-pulleys $I^1$ $I^2$ $I^3$ on the shaft $I^4$, upon which are bevel-gears $I^5$, connecting directly to the form. The spoke is fixed between the two centers D and E, the cutters revolving rapidly and the form revolved, at the same time revolving the spoke. The required shape is given to the spoke except to that portion which is to be made square. In turning, the former is brought to bear against a guide, $h$, which forms a guide to produce on the spoke the irregular form caused by the movement of the table, which carries the spoke, in consequence of the combined action of the guide $h$ and former G. A lever, L, is connected to the table, by means of which the operator moves the table back and forth, as may be required. The lathe as thus far constructed would leave that portion round or cylindrical. To square the spoke, we arrange a vertical shaft, N, in connection with the lever L, by means of which the said shaft may be moved up or down, as required; and from this shaft a connecting-rod, M, extends back to a toggle, P P, as seen in Fig. 3, which said toggle is attached to a carriage, R, carrying a vertical shaft, S, upon which is arranged a pulley, $S^1$, caused to revolve by a belt from a shaft, $S^2$. Upon this shaft is arranged a pinion, $S^3$, which is moved with the shaft S, as may be required, out of or into gear with a corresponding wheel, T, on another vertical shaft, $T^1$. Upon the upper end of this shaft is arranged a cam, $T^2$, against which a lever, U, bears, as seen in Fig. 2, and this lever extends forward in connection with a table, W, which is arranged upon the frame in guides to move longitudinally only, and on this table W a table, F, has its transverse movement; therefore, when the table W moves longitudinally it carries with it the table F and the parts attached thereto. Now, after the spoke has been turned, depress the lever L, which, through its connection M, depresses the toggle and forces the shaft S into connection with the shaft $T^1$, causing the shaft $T^1$ with its cam $T^2$ to revolve, and the said cam revolving forces the lever U from the cam, and consequently the table W in the opposite direction, which brings the square portion $g$ of the former into contact with the guide $h$, which square portion corresponds to the square portion required for the spoke, and gives a corresponding transverse movement to the table F, the operator at the same time bearing the table up to keep the former against the guide. That portion only of the spoke which is to be squared is brought into contact with the cutters and reduced to the shape of the former, the shape of the cam $T^2$ being sufficient for the length of the square portion to be wrought.

We claim as our invention—

1. In combination with the transverse table F and its mechanism for supporting and revolving the spoke, and the cutters, the longitudinal table W, to which a longitudinal movement is imparted by connecting the said table W with the cam T², substantially in the manner specified.

2. In combination with the cam T² and its coupling mechanism, and the tables F and W, the lever L, connected both to the table F and coupling mechanism, whereby the operator is enabled to impart both a longitudinal and transverse movement to the table F.

JOSIAH PIERCE.
AUGUSTIN B. CURTIS.

Witnesses:
 JAMES M. BROWN,
 W. W. SULLIVAN.